United States Patent
Guyaux

[15] 3,666,127
[45] May 30, 1972

[54] CARGO HANDLING APPARATUS
[72] Inventor: James R. Guyaux, San Jose, Calif.
[73] Assignee: FMC Corporation, San Jose, Calif.
[22] Filed: June 22, 1970
[21] Appl. No.: 48,229

[52] U.S. Cl..........................214/512, 214/519, 214/38 BA, 14/71, 182/62.5
[51] Int. Cl............................................B60p 1/02
[58] Field of Search.....................214/512, 38 D, 38 BA, 519; 182/62.5; 14/71

[56] References Cited

UNITED STATES PATENTS

| | | | |
|---|---|---|---|
| 3,090,514 | 5/1963 | Black et al. | 214/512 |
| 3,126,112 | 3/1964 | Shaw et al. | 214/512 |
| 3,136,433 | 6/1964 | Inghram | 214/38 |
| 3,259,255 | 7/1966 | Cresci | 214/1 |
| 3,263,832 | 8/1966 | Williams, Jr. et al. | 214/38 |
| 3,305,110 | 2/1967 | Tantlinger | 214/38 |
| 3,454,173 | 7/1969 | Martin | 214/38 |
| 3,506,144 | 4/1970 | Carder et al. | 214/38 |
| 3,524,558 | 8/1970 | Mastracci et al. | 214/38 |
| 3,524,563 | 8/1970 | McCartney et al. | 214/512 |
| 3,180,503 | 4/1965 | Shaw | 214/512 X |
| 159,571 | 2/1875 | Fuchslocher et al. | 182/62.5 |
| 1,546,698 | 7/1925 | Zoll et al. | 182/62.5 |
| 2,676,783 | 4/1954 | Rogers | 214/512 X |
| 1,121,142 | 12/1914 | Shea | 182/62.5 |

Primary Examiner—Albert J. Makay
Attorney—F. W. Anderson and C. E. Tripp

[57] ABSTRACT

An aircraft cargo-handling vehicle has an elevatable platform adapted to be raised approximately to the level of the sill of the aircraft cargo door, said platform being provided with a transfer bridge so connected to the platform that it can be extended from the platform to the aircraft sill for supporting the forward end of the platform during the loading and unloading operation.

8 Claims, 15 Drawing Figures

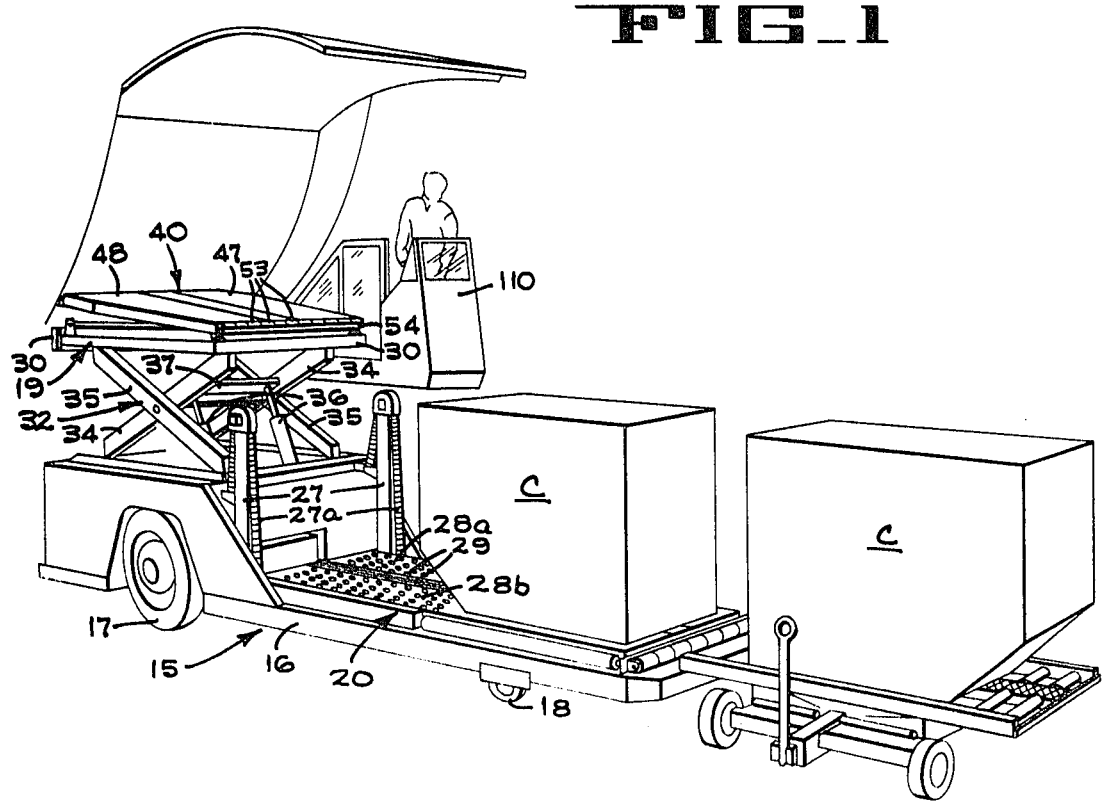
FIG_1
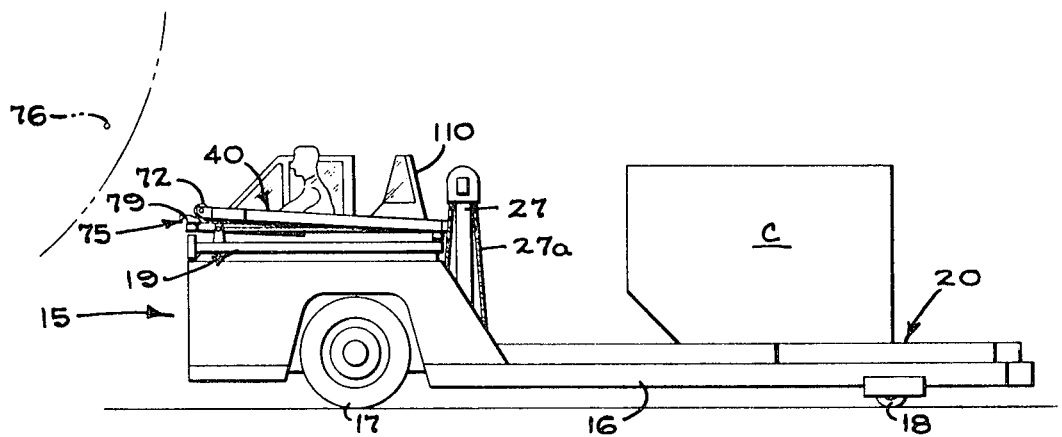
FIG_2
INVENTOR.
JAMES R. GUYAUX
BY F.W. Anderson
C.E. Tripp
ATTORNEYS

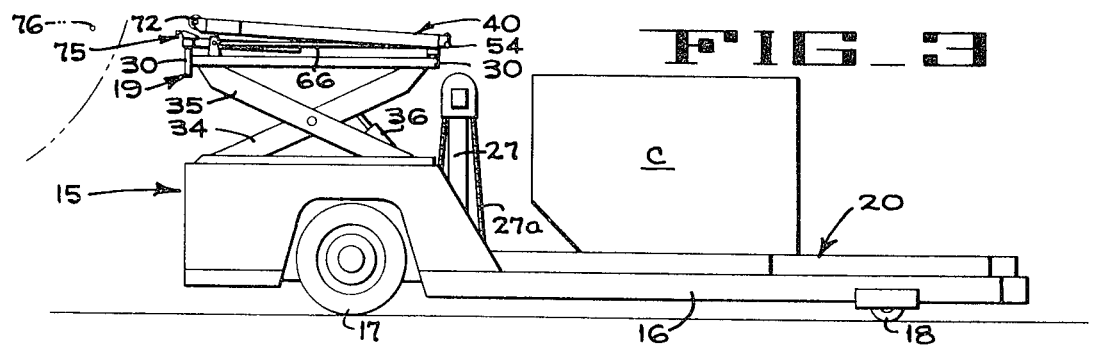
FIG_3
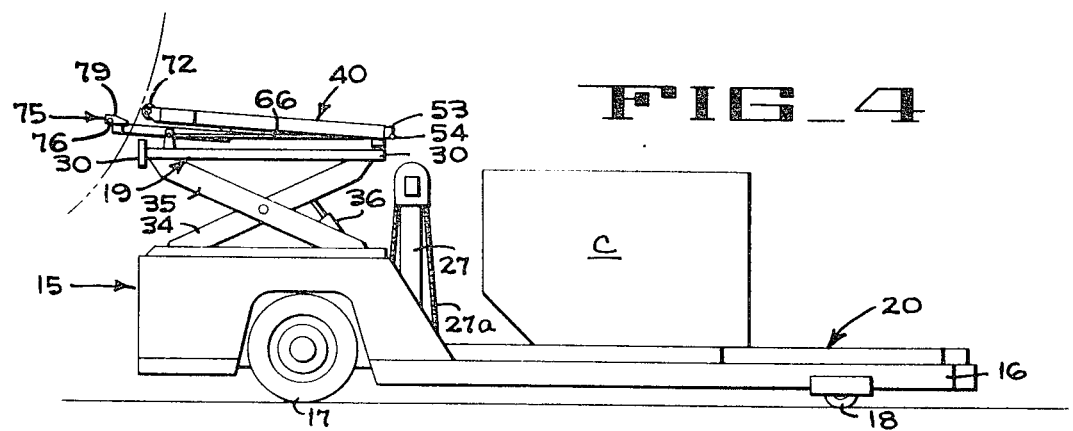
FIG_4
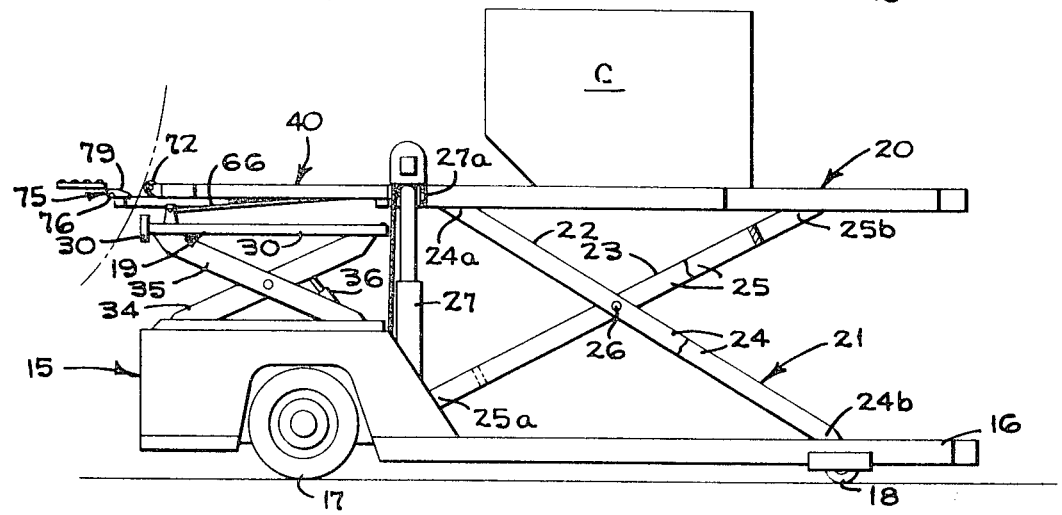
FIG_5

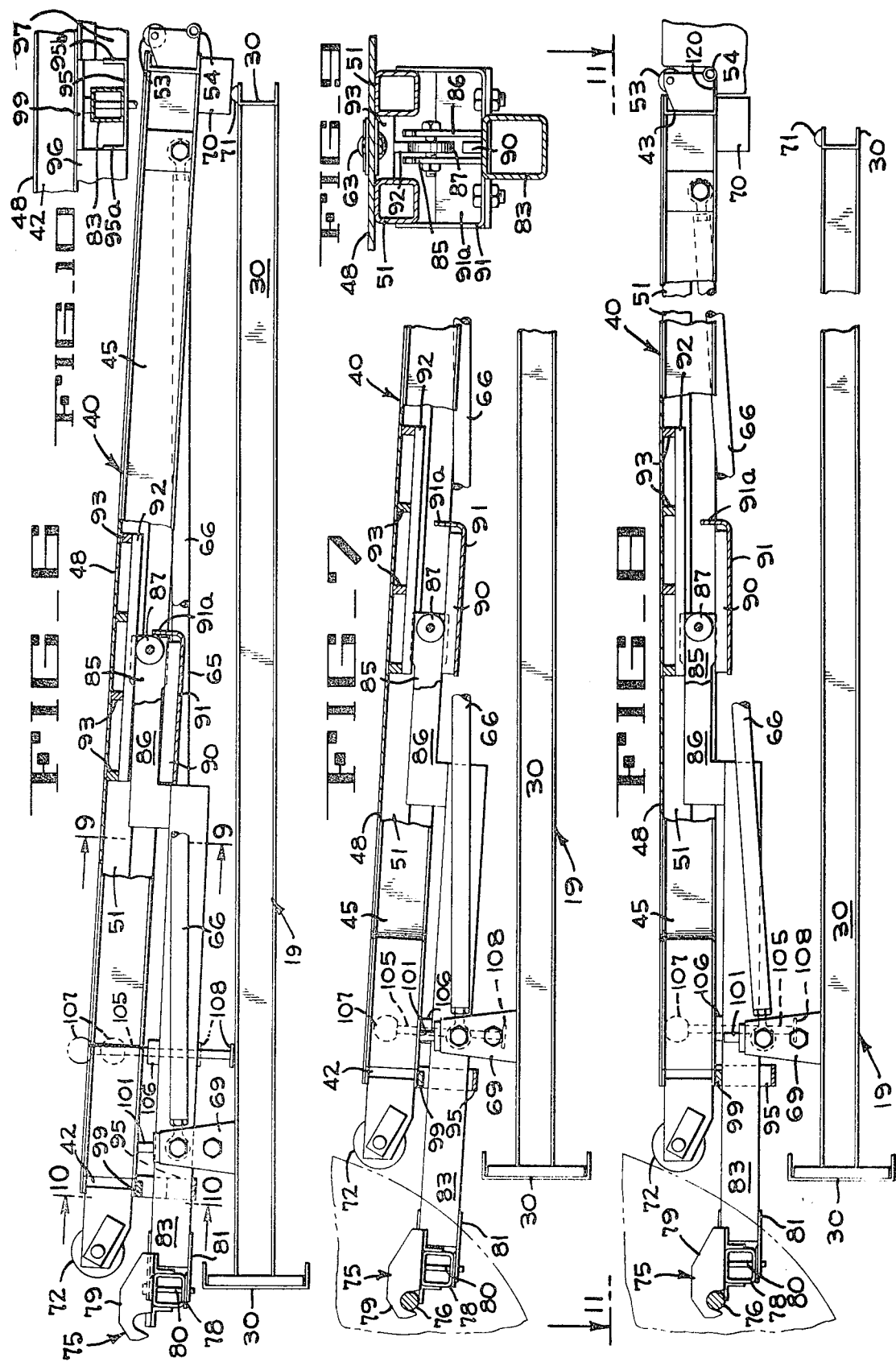

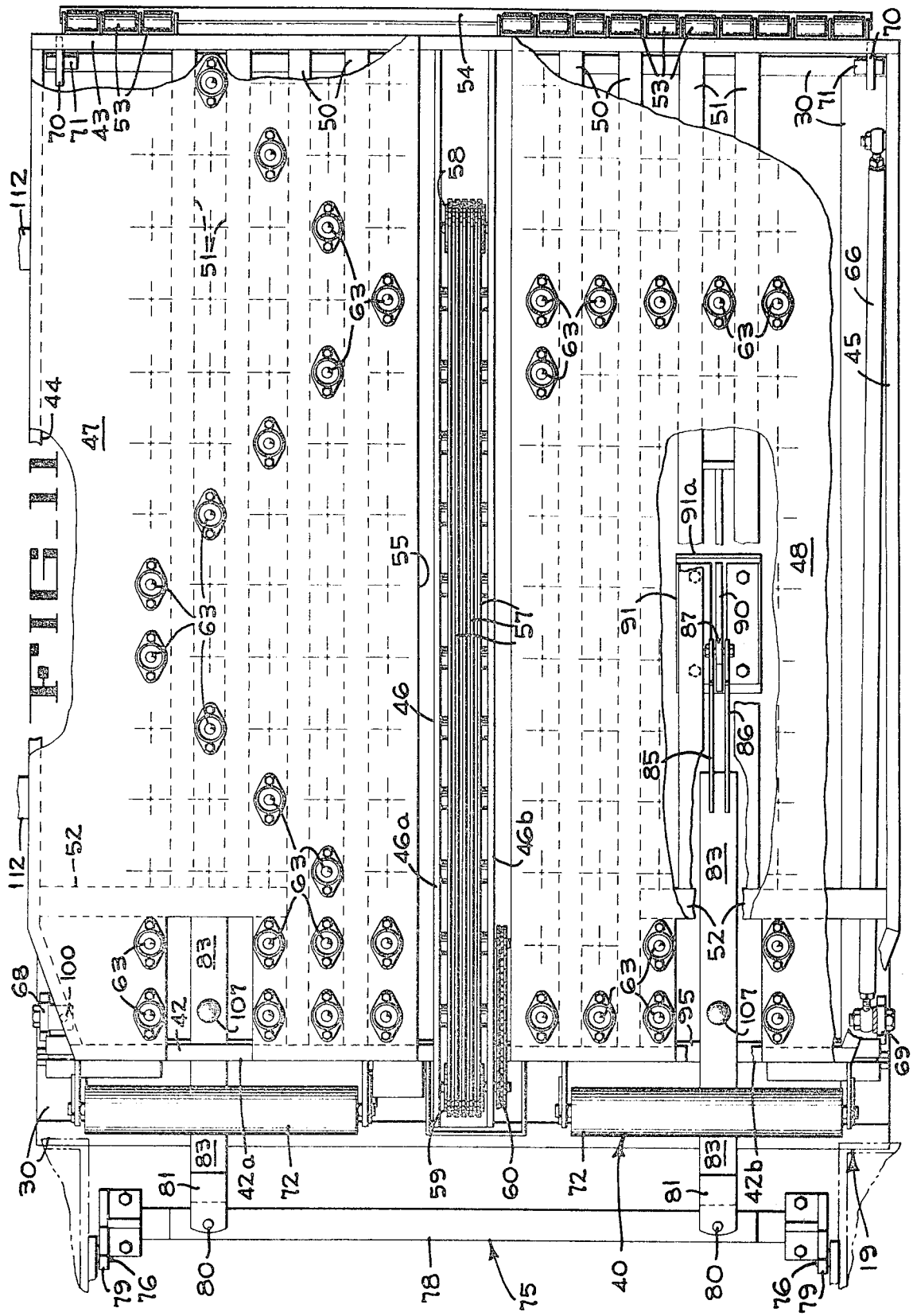

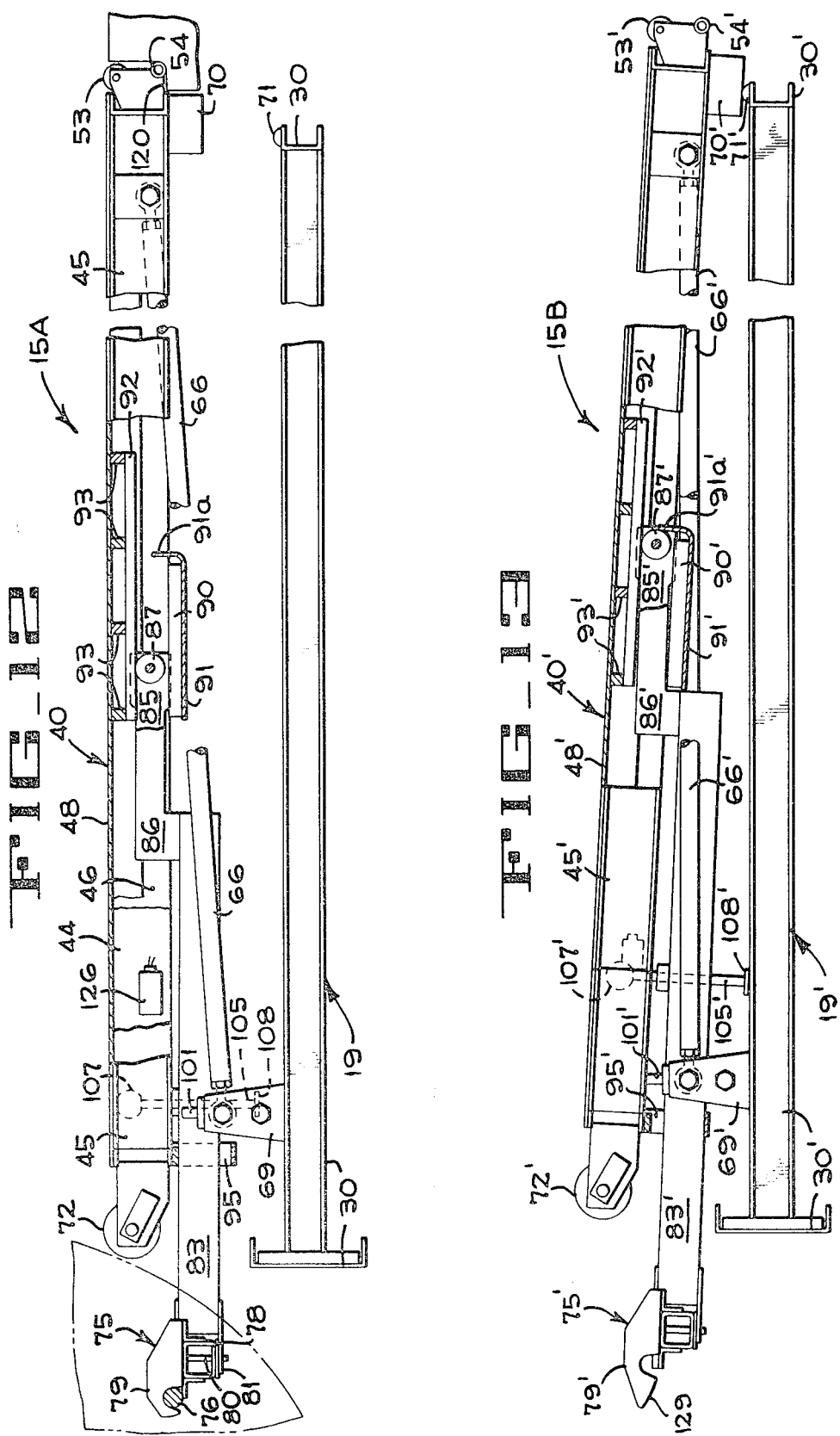

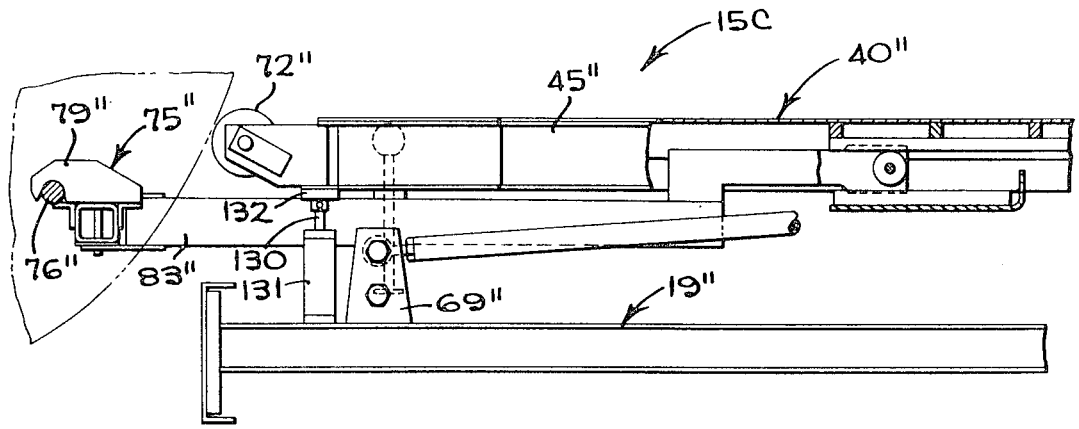
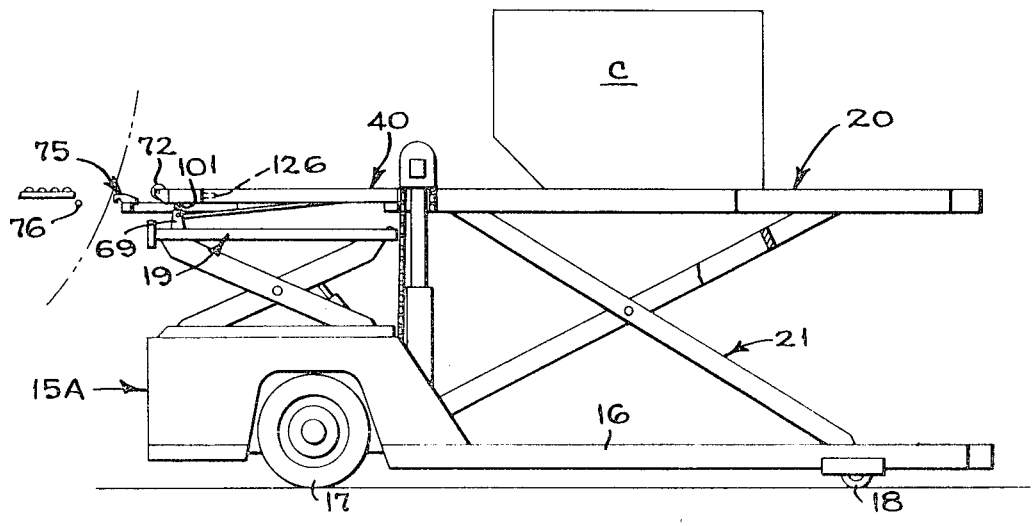

3,666,127

CARGO HANDLING APPARATUS

BACKGROUND OF THE INVENTION

The present invention relates in general to cargo handling apparatus, and more particularly to a mobile handing vehicle for loading and unloading aircraft.

Heretofore, cargo handling vehicles at the beginning of a loading operation were driven to a position adjacent the cargo opening of the aircraft and an adapter was removed from the vehicle and was manually placed on and locked to the floor of the aircraft at the cargo opening. Such an arrangement has been described in U.S. Pat. No. 3,160,300, issued to Donald M. Inghram for Cargo Handling Apparatus on Dec. 8, 1964; and also U.S. Pat. No. 3,136,433, issued to Donald M. Inghram for Cargo Handling Apparatus. The U.S. Pat. to Williams et al No. 3,263,832 discloses a cargo transfer platform having an extendable bridge. Other devices are disclosed in the patents listed at the end of the above-mentioned patents as cited references.

While the employment of the adapter provided an efficient arrangement for the transfer of cargo onto and from the aircraft, it did require that the adapter be manually secured through a pin and socket to the aircraft. Subsequently, the loader components were attached to the adapter. This practice is not only time consuming but is very difficult in many cases due to the weight of the structure.

SUMMARY OF THE INVENTION

A mobile cargo handling vehicle for transferring cargo between a ground station and a cargo compartment of an aircraft wherein a cargo transfer bridge, which is an integral part of the vehicle, is hooked to a transverse member of the aircraft that forms the lower portion of the frame which defines the cargo opening of the aircraft.

Through this arrangement, a cargo transfer bridge is provided for the cargo handling vehicle that is connected rapidly to the aircraft with facility and ease of operation, and yet, the cargo movement thereover is rapid and uninterrupted during the loading and unloading operation. By obviating the need for an adapter, the present invention provides a cargo handling apparatus which performs the cargo loading and unloading operation in a rapid, relatively trouble free and comparatively safe manner.

With the cargo transfer bridge hooked to the spools of the lower portion of the frame defining the cargo opening of the aircraft the cargo transfer bridge not only remains in registry with the lower portion of the frame defining the cargo opening of the aircraft, but also assumes a position corresponding with the aircraft roll plane in the various positions assumed by the aircraft during the loading and unloading operations. Of course, there is no gap or interrupted cargo support between the aircraft and the cargo transfer bridge.

BRIEF DESCRIPTION OF THE DRAWINGS

FIG. 1 is a schematic perspective of the selfpropelled cargo handling apparatus of the present invention.

FIGS. 2–5 are schematic operational views of the apparatus of FIG. 1.

FIGS. 6–8 are side elevations of the upper portion of the forward lift mechanism, partly broken away and illustrating different operational positions of the mechanism.

FIG. 9 is a section taken on line 9—9 of FIG. 6.

FIG. 10 is a section taken on line 10—10 of FIG. 6.

FIG. 11 is a plan view, partly broken away, taken along line 11—11 of FIG. 8.

FIG. 12 is a fragmentary side elevation of the upper portion of a second embodiment of the lift mechanism of the present invention.

FIG. 13 is a fragmentary side elevation of the upper portion of a third embodiment of the lift mechanism.

FIG. 14 is a fragmentary side elevation of the upper portion of a fourth embodiment of the present invention.

FIG. 15 is a schematic operational view of a fifth embodiment of the apparatus of the present invention.

DESCRIPTION OF THE PREFERRED EMBODIMENT

The self-propelled cargo handing vehicle 15 comprises an elongate chassis or frame 16 supported on a pair of powered front wheels 17 and a pair of relatively small rear wheels 18. A platform 19 is mounted on the forward end of the vehicle, and a deck 20 is mounted on the rearward portion, both members being movable up and down. Mounted on the rearward portion of the frame 16 (FIG. 5) is a lift or elevator mechanism 21 which is a conventional scissors lift mechanism that includes two crossed lever arm units 22 and 23 disposed on opposite sides of the chassis with transverse braces rigidly spacing the arms. Each unit has two crossed arms 24 and 25 pivotally interconnected by a transverse rod 26. An end 25a of each lever 25 is pivotally connected to the frame 16 and an end 24a of each lever 24 is pivotally connected to the rear deck 20. The end 24b of each lever 24 is provided with a roller (not shown) that rides along a sill of the chassis 16, and an end 25b of each arm 25 is in rolling engagement with a channel on the underside of the deck 20.

Two laterally spaced hydraulic cylinders 27 (FIG. 1) are mounted in upright position on the chassis, the piston of each cylinder being connected through a chain 27a to the forward end 24a of one of the lever arms 24. Each chain is anchored at one end to the chassis and is trained in a conventional manner around a pulley mounted at the outer end of the piston rod so that, as the piston is projected out of the cylinder, the forward end of the attached arm 24 is raised, causing the deck 20 to be elevated to the position of FIG. 5.

The deck 20 is essentially a flat deck having flat plates 28a and 28b defining a longitudinal slot in which one or more power driven belt conveyors 29, which are driven by a reversible motor, are disposed. The conveyors are positioned to engage the bottom surface of containers C and advance them alternately forwardly and rearwardly along the deck which is provided with a plurality of free ball units over which the carton or container C moves.

The front platform 19 is a rigid, rectangular, open frame member made up of side, front and rear channels 30 and is supported on an elevated forward end of the chassis by means of a scissors lift mechanism 32 which includes two crossed lever arm units, each unit having two crossed and pivotally interconnected arms 34 and 35. The rearward ends of the arms 34 and 35 are pivotally connected to the platform 19 and chassis respectfully, while the forward ends of the arms 35 and 34 are in rolling contact with the platform and the chassis respectively. Two power cylinders 36 are connected to a transverse brace 37 extending between the arms 34. When the cylinders are actuated, the deck is elevated as seen in FIG. 1.

A bridge 40 (FIGS. 3–5) is carried by the platform 19 and, as seen in FIG. 5, it is capable of being moved vertically relative to the platform. The bridge includes a frame comprised on a front channel 42 (FIG. 6) and a rear channel 43 rigidly interconnected by two side channels 44 and 45 (FIG. 11). The front channel 42 is made up of two aligned channel sections 42a and 42b that are rigidly joined by the upstanding walls 46a and 46b of a deep channel 46 which extends longitudinally of the bridge and is welded at its rear end to rear channel 43. A pair of flat deck plates 47 and 48 are welded to the upper surface of the frame channels and rest in supported relation on a plurality of box beams 50, that are welded to and extend between the front and rear channels, and on box beams 51 that extend between the rear channel 43 and short cross channels 52. A plurality of aligned rollers 53 are mounted on the rear channel 43 above a rigid metal bar 54 which extends across the rear of the bridge.

The inner edges of the deck plates 47 and 48 are spaced from each other to define a slot 55 in which the deep channel 46 is positioned. A plurality of endless belts 57 are disposed in the channel 46, being trained around an idler pulley 58 and a drive pulley 59 that is driven through a chain drive 60 from a reversible electric motor (not shown). The upper run of the conveying surface, provided by the belts 57, can move toward the rear or toward the front of the bridge, with the surface being in a generally horizontal plane slightly above the plane of the support surface defined by a plurality of ball units 63 secured to the deck plates. Thus the belts are arranged to urge cartons, carried by the ball units, toward the front or the rear of the bridge.

The bridge 40 is connected to the platform 19 by two tie bars 65 and 66 (FIG. 6), bar 65 being pivotally connected to a pedestal 68, that projects upwardly from one side channel of the platform 19, and to the side channel 44 of the bridge. Similarly, the tie bar 66 is pivotally connected to a pedestal 69 (FIG. 11) projecting upwardly from the other side channel of platform 19, and to the side channel 45 of the bridge. The tie bars are not load-bearing members—their function being to prevent longitudinal movement of the bridge relative to the platform 19 when cartons are being moved onto or off of the bridge. A similar tie bar can be pivotally connected between the platform 19 and the bridge to extend transversely of the bridge at the front thereof to prevent transverse movement of the bridge relative to the platform 19. At each rear corner of the bridge, a plate 70 is welded to the undersurface of rear channel 43 to extend downwardly therefrom and engage the rounded upper surface of a bumper 71 that is secured to the upper surface of the rear channel of the platform 19.

A pair of cylindrical rollers 72 (FIG. 11) are mounted on the forward end of the bridge, the upper surfaces of the rollers being substantially in the plane of the support surface provided by the ball units 63.

Referring to FIGS. 6–8, it will be noted that a hook assembly 75 is carried by the underside of the bridge 40. FIG. 6 discloses the normal, retracted position of the hook while FIG. 7 discloses a position in which the hook assembly has been moved outwardly of the bridge and hooked over two positioning pins 76 that are rigidly secured to the sill of the aircraft by brackets 77 (FIG. 11), each pin being positioned to project inwardly toward the center of the aircraft doorway.

The hook assembly 75, which in operation supports one end of the bridge and will be referred to hereinafter as a bridge support, comprises a rigid tubular bar 78 (FIG. 11) disposed transversely of the front end of the bridge and carrying a hook member 79 adjacent each end. The bar 78 is pivotally connected by pins 80 to yokes 81 carried at the ends of two identical support arms 83, which are tubular steel members, square in transverse cross-section. Near the rearward end of each arm 83, two upright blade members 85 and 86 (FIG. 9) are welded in spaced relation, and a roller 87 is rotatably mounted between the enlarged end portions of the blades. The roller is in vertical alignment with a lower guide strap 90, which is carried by a U-shaped housing or retainer 91, and with an upper guide strap 92 which is secured to and depends from a plurality of support members 93. An upturned end 91a of housing 91 acts as a stop to limit the inward movement of the support arm as it is moved to retracted position.

Near its forward end, each support arm 83 extends through a bracket 95 which, as seen in FIG. 10, is a U-shaped member whose upstanding legs 95a and 95b are welded, respectively, to the end face of a deep channel 96 and an angle bracket 97. Both the channel 96 and the angle bar 97 are welded to the lower flange of the front channel 42 of the bridge. An abutment strap 99, which is also welded to the channel 42, extends across the upper end of the bracket above the support arm. The space between the legs 95a and 95b of each bracket 95 is somewhat larger than the associated arm 83 as clearly illustrated in FIG. 10 thus permitting the hook assembly 75 (FIG. 11) to be moved in a direction substantially parallel to the forward edge of the bridge to aid in aligning the hooks 79 with their associated pins 76.

A support post 100 (FIG. 11) is secured to the pedestal 68 in underlying relation to the side channel 44 of the bridge, and an identical post 101 (FIG. 6) is secured to the pedestal 69 in underlying relation to the channel 45.

In order that the operator can move the hook assembly toward and away from the aircraft, a lift rod 105 (FIG. 6) is provided substantially intermediate the length of each support arm 83. Each rod extends vertically through aligned holes in the arm and in a collar 106 welded to the upper surface of the arm. When the support arm is to be moved, a ball 107 on the upper end of the rod is gripped by the operator and the rod is raised until a lift plate 108 on the lower end of the rod abuts the undersurface of the arm. Further upward movement of the lift rod will move the support arm away from its rest position on the bracket 95 and will cause the roller 87 to engage the lower guide strap 90, whereby the support arm can be easily moved relative to the bridge. It will be noted in FIG. 11 that an opening is provided in each deck plate to provide access to the lift rods.

An operator's cab 110 (FIG. 1) is mounted alongside the platform 19 being supported from the platform by a pair of beams 112 (FIG. 11) which project out-wardly from the platform. The level of the floor of the cab is below the level of the surface of the bridge but close enough in all positions of the bridge so that the operator can step from the cab to the bridge. Controls are provided in the cab for controlling the actuation of the power mechanisms associated with the various operating members including the scissors lifts, and the conveyors.

In an aircraft loading sequence, the vehicle 15 is driven toward the aircraft with the container C on the deck 20, and with the platform 19 and bridge 40 in a lowered position and with the side channels of the bridge resting on the upstanding support posts 100 and 101 of the platform and the rear channel resting on the bumpers 71 through plates 70. When the vehicle reaches a point where its forward end is close to a position under the sill of the aircraft, and each of the two spaced hooks 79 is disposed approximately in the same vertical plane as the aircraft positioning pin 76 with which it is to be engaged, the vehicle is stopped and the forward scissors lift 32 is actuated to raise the platform 19 and the bridge 40 to the position of FIG. 3 at which the bridge and the hook assembly 75 are opposite the positioning pins. The operator steps onto the bridge, and by manipulating the lift rods 105, he positions each hook member 79 over the associated aircraft positioning pin as seen in FIG. 4. After returning to the control cab, the operator activates the forward scissors lift to lower the platform 19, moving the support posts 100 and 101 and the bumpers 71 downwardly out of supporting relation with the channels 44, 45 and 43. Then the operator actuates the rear scissors lift 21 to raise the rear deck 20. As the platform 20 approaches the elevation of the bridge, a lip 120 (FIG. 8) formed on the forward edge of the platform 20 engages the underside of the lift bar 54 on the bridge, causing the bridge to swing counterclockwise (FIG. 8) with the positioning pins 76 providing a pivot axis for the forward end of the bridge and the telescoping mounting of the hook assembly relative to the bridge permitting elongation of the bridge. When the bridge reaches a substantially horizontal position, the operator stops the upward movement of the rear deck 20. This stopping operation can be performed automatically in a conventional manner by a mercury switch mounted on the bridge and connected in a control circuit that is effective to deenergize the power cylinders 27 of the lift mechanism.

Referring to FIG. 5, it will be noted that the bridge is now supported by the aircraft and the deck 20, and is free of the platform 19 except for the connection through the tie-bars 65 and 66. Also it should be noted that, while the rear deck 20 is locked by means of its control mechanism, the bridge itself can pivot clockwise to adjust itself to movements of the aircraft and, during this adjusting movement, the hook assembly can adjust itself relative to the bridge proper.

When the deck 20 and the bridge 40 are in the FIG. 5 position, the container C can be advanced into the aircraft by activating the belt conveyors 29 on the deck 20 to transfer the container from the deck to the bridge, and actuating the belts 57 to move the container into the aircraft.

In unloading containers from the aircraft, the reverse procedure is followed, that is, with the apparatus in the position of FIG. 5, the belts 57 and belt conveyors 29 are actuated in a direction to move the container onto the rear deck 20.

The platform 19 is then raised to move the support pins 100 and 101 into supporting engagement with the bridge. The rear deck 20 is then lowered, causing the plates 70 on the rear channel of the bridge to come to rest on the bumpers 71 on the platform 19. Further lowering of the rear deck results in the lip 120 at the front of the rear deck to drop out of engagement with the bar 54 of the bridge. When the rear deck is in its lowered position, the container is moved off the deck onto a suitable transporting vehicle. The platform 19 and the bridge 40 may be lowered to the FIG. 1 position.

It is evident that if, during the loading or unloading operation, the aircraft settles in a fore-and-aft direction, there will be a twisting action set up that tends to warp the bridge 40. The fact that the bridge is made up principally of longitudinal beams permits a twisting action of the bridge to accommodate this aircraft action. As mentioned above, the pivoted mounting of the hook assembly on the aircraft positioning pins accommodates lowering and raising of the aircraft as it is being loaded.

It will also be evident in FIG. 5 that, since the rear lift mechanism 21 and the aircraft provide the entire support for the transfer platform 19 during the cargo-transferring operation, the forward lift mechanism 32 may be a relatively light inexpensive lift device.

In FIG. 12 a portion of a second embodiment 15A of the cargo handling vehicle of the present invention is illustrated. The apparatus is identical to the apparatus of FIG. 8 and identical members are given identical reference numerals in both views. The feature of embodiment 15A is the use of a mercury switch 126 that is mounted on the side channel 44 near the forward end of the bridge 40. As mentioned previously, this switch is connected in a control circuit in a conventional manner to deenergize the power cylinders 27 that raise the deck 20, and the switch is effective to sense the arrival of the channel 44 of the bridge at a horizontal position and to stop the upward movement of the deck and the bridge when this position is reached.

Accordingly, with this arrangement the main portion of the bridge will always be brought to a horizontal position regardless of the fore-and-aft inclination of the sill of the aircraft (some aircraft are characteristically nose-down when at rest)—it being recognized that, if the sill of the aircraft is inclined and the hook assembly 75 is connected thereto, the bridge will warp somewhat to accommodate the inclination. In general, however, the bridge will remain substantially in a horizontal plane and cargo can be easily transferred thereover.

In FIG. 13 a portion of a further embodiment 15B of the cargo-handling vehicle is illustrated. This figure is similar to FIG. 6, and most of the mechanisms of both views are identical and are given identical reference numerals with a prime suffix. The vehicle 15B differs from that of FIG. 6 in that support arms 83' of the hook unit 75' of vehicle 15B are somewhat longer than those of hook unit 75 of vehicle 15 so that while the rollers 87' at the rear of unit are engaged with the retainer flanges 91a', the hooks 79' are far enough forward of the rollers 72' to permit the hooks to engage over the positioning pins 76 on the airplane. Accordingly, in one type of preliminary operation, the two hooks 79' are accurately aligned in the same vertical planes as the two pins 76 when the vehicle 15B is originally maneuvered into position adjacent the airplane with the platform 19' in lowered position. Then, when the platform is raised to bring the hooks to the same elevation as the pins, and the vehicle is driven toward the airplane, the hooks 79' will be cammed upwardly by the engagement of the slanted forward edges 129 of the hooks with the pins. As the hooks pass over the pins, they will drop into position thereover, locking the hook unit to the airplane as the vehicle is stopped. The abutment of the two upstanding flanges 91a' with two rollers 87' will, of course, cause the hook unit to move forwardly with the vehicle, and the relatively loose mounting of the support arms 83' in the brackets 95' and in the housings 91' will permit the upward movement of the hooks as they pass over the pins.

The hook unit 75' may also be positioned on the airplane by the previously-described operation of gripping the knobs 107' and manually advancing the hooks 79' into hooked engagement with the positioning pins. In this case, due to the extra length of the arms 83', there will be a gap between the rollers 72' of the bridge 40' and the floor of the airplane. This gap will be small enough, however, for a container C to bridge it easily as the container is moved into the airplane.

In FIG. 14, a still further embodiment 15C of the cargo-handling vehicle is illustrated. In vehicle 15C, the side channel 45'' is not supported by a post projecting upwardly from the pedestal 69'' but is supported by the extendible member 130 of a double-acting hydraulic power cylinder 131. The cylinder is fixed on the platform 19'' and the extendible member 130 engages the underside of a rigid plate 132 that is secured to the corner of the bridge 40''. Conventional controls are provided so that the operator can, while in his cab, energize the cylinder to cause the member 130 to be projected upwardly, to raise the corner of the bridge, or to be withdrawn downwardly into the cylinder, permitting the corner of the bridge to be lowered. Accordingly, if the sill of the airplane is inclined in a direction longitudinally of the airplane, the operator can incline the forward end of the bridge to match the inclination of the sill by manipulation of cylinder 131. Since one of the support arms 83'' for the hook unit is adjacent the corner of the bridge that is supported on the trim cylinder 131, the hook 79'' adjacent that corner will be raised or lowered and the forward end of the hook unit will assume a corresponding inclined position that will facilitate the positioning of the hooks 79'' on the positioning pins 76'' of the airplane.

In FIG. 15, the vehicle 15A of FIG. 12 is shown in operation without the hook unit 75 having been connected to the airplane. It should be noted that, since the hooks are not engaged with the airplane, the bridge 40 will be raised to horizontal position without the forward end of the bridge being lifted out of engagement with the posts 100 and 101 (only the post 101 being shown) projecting upwardly from the brackets 68 and 69 of the platform 30. In this operation a relatively small gap extends between the rollers 72 and the floor of the airplane which the container C must bridge as it is moved into the airplane. Although in this type of operation the front end of the bridge is not rigidly connected to the airplane to obtain support therefrom, the advantage of the automatic levelling by the mercury switch 126 is retained. As a result, the surface of the bridge is in an advantageous horizontal position which makes possible the efficient transfer of the cargo container over the bridge, across the gap, and into the airplane.

Although the best mode contemplated for carrying out the present invention has been herein shown and described, it will be apparent that modification and variation may be made without departing from what is regarded to be the subject matter of the invention.

What is claimed is:

1. In cargo handling apparatus of the type wherein a wheeled support structure carries a cargo transfer bridge having a cargo supporting surface, which bridge is arranged for movement between a lowered position and an elevated position substantially at the level of the sill of an aircraft loading door, means for raising and lowering said bridge, the improvement which comprises a bridge support having a portion underlying the cargo supporting surface at one end of said bridge, said bridge support being connected to said bridge for vertical movement therewith and having means at one end adapted to be engaged in pivotal supported relation with the aircraft adjacent the door sill to position said bridge in general alignment with the aircraft door, said bridge support being movable relative to the bridge toward and away from said door and having its one end movable in a direction parallel to said one end of said bridge, and means for supporting the other end of said bridge for pivotal movement about a generally horizontal axis, said bridge and said bridge support being solely supported by said aircraft at said one end and at said axis at said other end, said bridge and said bridge support enabling cargo to be moved across said bridge to and from the aircraft at a time when wind gusts cause the aircraft to raise and lower the sill, to move the sill toward or away from the bridge, and to vary the pitch of the sill from a generally horizontal position to an inclined position.

2. Cargo handing apparatus according to claim 1 wherein said bridge support member has hook means at its outermost end adapted for engagement in supported relation with the aircraft.

3. Cargo handling means according to claim 1 wherein said bridge has retainers secured thereto below its cargo supporting surface at laterally spaced intervals, and said bridge support including two rigid members reciprocally mounted in said retainers.

4. Cargo handling apparatus according to claim 3 wherein said bridge support includes a bar extending between a pair of transversely aligned ends of said rigid members and movably connected thereto, and aircraftengaging means carried adjacent the ends of said bar.

5. Cargo handling apparatus according to claim 1 wherein said bridge comprises a plurality of elongated rigid structural members secured together, said members being constructed to resist bending about a transverse axis, and said members being secured to each other in a manner to permit limited flexing movement of said bridge about an axis extending longitudinally of said members to accommodate pitching of the aircraft.

6. In cargo handling apparatus of the type wherein a wheeled support structure carries an elevating means having a vertically movable portion mounted on said structure for movement between lowered and elevated positions, the improvement which comprises a bridge in superposed supported relation on said elevating means and having a cargo supporting surface, means connecting said bridge and said elevating means against relative movement longitudinally of the wheeled support structure, a bridge support member carried on said bridge for movement vertically with said bridge and for movement from a retracted position to an extended position wherein an edge of said bridge support member is spaced from the forward edge portion of said bridge, connecting means on said support member adapted to be moved transversely of said forward edge of said bridge and to be secured in supported relation on the aircraft, and means for supporting the rear edge portion of said bridge independently of said platform for pivotal movement about a generally horizontal axis, said connecting means and said axis being at opposite ends of said bridge for providing sole support for said bridge during transfer of cargo, said bridge and support enabling cargo to be moved across said bridge to and from the aircraft at a time when wind gusts cause the aircraft to raise and lower the sill, to move the sill toward or away from the bridge, and to vary the pitch of the sill from a generally horizontal position to an inclined position.

7. Cargo handling apparatus according to claim 6 wherein said means for supporting said opposite edge of said bridge comprises a cargo elevator having a cargo-support surface and an abutment member adjacent one edge of said surface adapted to engage the rear edge of said bridge during upward movement of said surface to lift said rear edge portion of said bridge away from said platform whereby said bridge is supported between said elevator and the aircraft-supported bridge support member.

8. Cargo handling apparatus according to claim 7 wherein said bridge comprises a plurality of elongated rigid members extending from adjacent the forward edge portion of the bridge to adjacent the rear edge portion thereof to provide a structure that resists bending about an axis transverse to said members and permits flexing of said bridge about an axis extending longitudinally of said members.

* * * * *

PO-1050
(5/69)

UNITED STATES PATENT OFFICE
CERTIFICATE OF CORRECTION

Patent No. 3,666,127        Dated   May 30, 1972

Inventor(s)       JAMES R. GUYAUX

It is certified that error appears in the above-identified patent and that said Letters Patent are hereby corrected as shown below:

Column 3, line 58, after "angle" change "bar" to --bracket--.

Signed and sealed this 14th day of November 1972.

(SEAL)
Attest:

EDWARD M. FLETCHER, JR.
Attesting Officer

ROBERT GOTTSCHALK
Commissioner of Patents